(12) United States Patent
Hoelzl et al.

(10) Patent No.: US 11,031,973 B2
(45) Date of Patent: Jun. 8, 2021

(54) CIRCUIT, METHOD AND APPARATUS FOR PERFORMING NEAR-FIELD COMMUNICATION

(71) Applicant: Infineon Technologies AG, Neubiberg (DE)

(72) Inventors: Juergen Hoelzl, Graz (AT); Josef Gruber, St. Ruprecht An der Raab (AT); Walther Pachler, Wetzelsdorf (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/594,656

(22) Filed: Oct. 7, 2019

(65) Prior Publication Data

US 2020/0112339 A1 Apr. 9, 2020

(30) Foreign Application Priority Data

Oct. 8, 2018 (DE) .......................... 102018124680.3

(51) Int. Cl.
*H04M 1/00* (2006.01)
*H04B 5/00* (2006.01)
*G06K 19/07* (2006.01)
*H04M 1/72412* (2021.01)

(52) U.S. Cl.
CPC ....... *H04B 5/0025* (2013.01); *G06K 19/0727* (2013.01); *H04M 1/72412* (2021.01); *H04M 2250/04* (2013.01); *H04M 2250/14* (2013.01)

(58) Field of Classification Search
CPC .. H04B 5/0025; H04B 5/0031; H04B 5/0081; H04B 1/3816; H04W 4/80; H04W 8/183; H04W 12/00407; G06F 7/0008
See application file for complete search history.

(56) References Cited

U.S. PATENT DOCUMENTS

2014/0374491 A1* 12/2014 Cho ................. G06K 19/07739
235/492
2015/0348007 A1* 12/2015 Khan ................. G06Q 20/4018
705/44
2016/0379206 A1* 12/2016 Lee ..................... G06Q 20/3278
705/40

\* cited by examiner

*Primary Examiner* — Tuan Pham
(74) *Attorney, Agent, or Firm* — Schiff Hardin LLP

(57) ABSTRACT

A circuit for performing a near-field communication having a contactless circuit which is configured for the contactless exchange of data signals with an external contactless reading device, a security circuit which has a memory in which application identifiers are stored and which is configured to execute security-related applications, and a control circuit which is configured to execute non-security-related applications, wherein the contactless circuit, the security circuit and the control circuit are coupled with one another in such a way and, using at least one of the application identifiers, are configured in such a way that the data signals are supplied from the contactless circuit to the control circuit and vice versa exclusively by means of the security circuit. The security circuit can furthermore store bonding and authentication keys for applications in the control circuit in order to set up a secure data exchange channel for these applications.

18 Claims, 5 Drawing Sheets

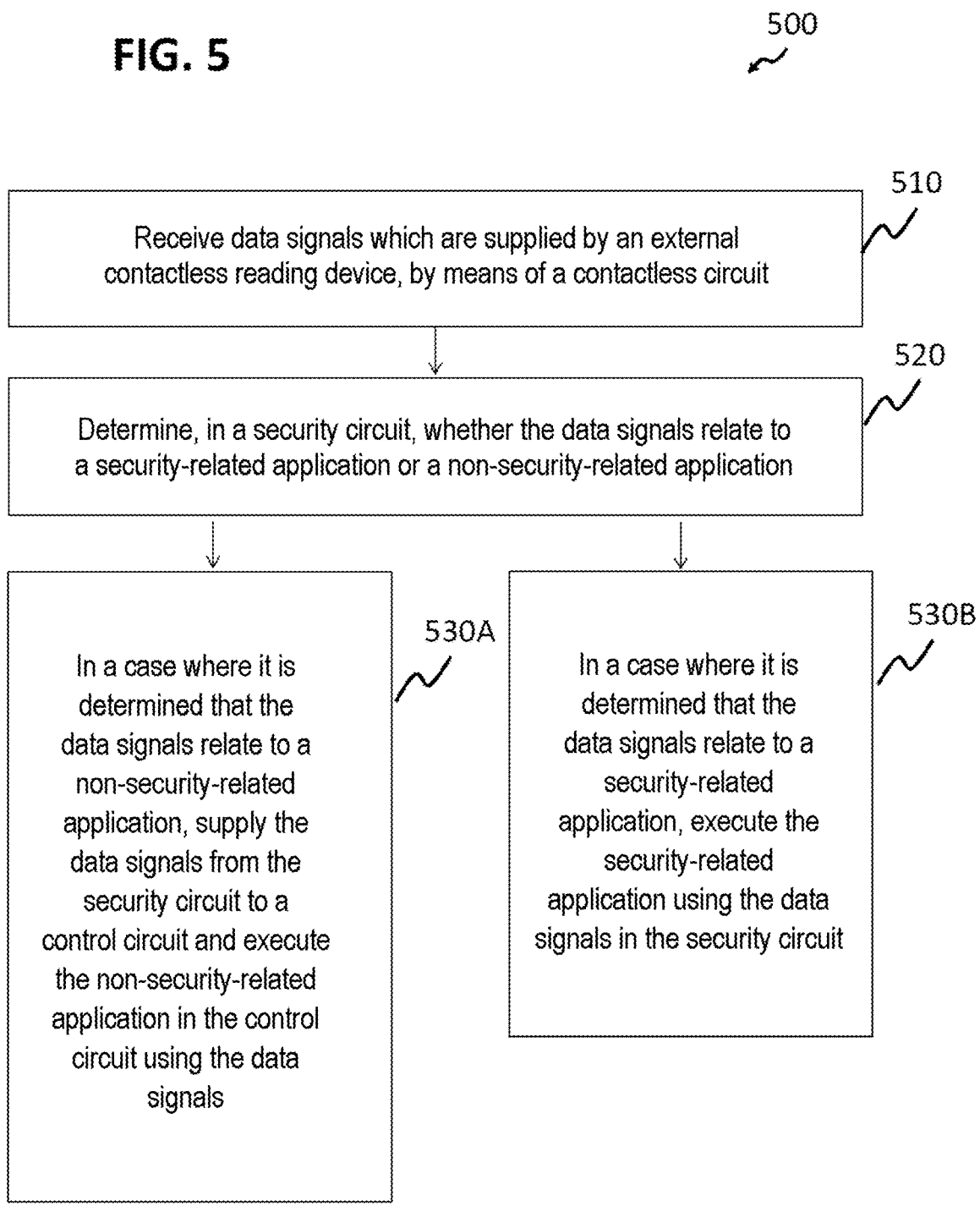

CIRCUIT, METHOD AND APPARATUS FOR PERFORMING NEAR-FIELD COMMUNICATION

TECHNICAL FIELD

This disclosure relates to a circuit and a method for performing a near-field communication.

BACKGROUND

FIG. 1A shows a schematic representation of conventional architectures of systems for near-field communication (NFC). A passive NFC system is shown above, and an active NFC system is shown below which can supply a boosted signal to an external reading device, also referred to as a reader, e.g. a reading unit for contactless chip cards, e.g. a proximity coupling device (PCD) according to ISO/IEC 14443), or can boost a weak signal received from the reading device to supply it to an NFC controller.

Both systems are suitable for applications such as payment transactions, access authorizations, tickets, etc., wherein the active system is additionally suitable for use in devices with a small form factor which are often designed as "wearable" devices and are therefore also referred to as "wearables", e.g. watches, etc. (see FIG. 1B).

A near-field communication in the case of devices having a small form factor is not currently capable of supporting a host card emulation (HCE) for NFC applications in a manner which would be acceptable on the market. Instead, a system such as that shown in FIG. 2 would have an increased power consumption which is critical for small form factors (smaller battery).

Payment methods such as "Android Pay", for example, or applications which impose no (or only minimal) data security requirements and are based on host card emulation are accordingly not supported.

SUMMARY

A need therefore exists for a device for performing a near-field communication which is capable of enabling HCE applications even with an NFC architecture which uses signal boosting (e.g. for use in wearables).

A device of this type is provided in different example embodiments.

An NFC support of host card emulations by means of a low-cost NFC hardware architecture is provided in different example embodiments. This can be applied, for example, in smart wearables.

A conventional, fully equipped NFC architecture (i.e., in particular, the NFC controller) is no longer required. An amplifier function can be provided by an amplifier circuit (also referred to as a booster circuit), e.g. an amplifier or booster chip which offers a plurality of commercial and technical advantages compared with the NFC controller for small form factors.

A booster chip can furthermore be designed as smaller than an NFC controller, so that the entire circuit can also be designed as smaller.

The circuit according to different example embodiments can furthermore require fewer additional electrical components.

An energy consumption of the circuit according to different example embodiments can be reduced in general and also, in particular, in standby mode.

The circuit for providing a near-field communication according to different example embodiments accordingly enables a provision of low-cost host card emulations in NFC devices with a small form factor.

The circuit according to different example embodiments is furthermore less complex than the circuit according to the prior art.

The circuit according to different example embodiments can be designed so that firmware is provided only within the secure element, whereas the booster chip requires no firmware, so that a standard booster chip can be used for a plurality, e.g. all, circuits according to different example embodiments.

In terms of data security, provision of the firmware (e.g. the entire firmware) within the secure element can mean that the entire firmware is located within an area which is protected (against unauthorized data access).

A list of application identifiers, for example, also referred to as application IDs or AIDs which are stored according to the prior art in the NFC controller can be stored according to different example embodiments in the secure element.

The AID list can thus be protected. A (data-) secure exchange mechanism can furthermore be provided for an insertion (installation) of the AID list in the secure element.

Furthermore, a secure data channel which accesses, for example, bonding and authentication can be configured by the secure element and can be used for HCE applications. In other words, the secure data channel can be configured by means of a security circuit (e.g. the secure element) between a control circuit (e.g. the host controller) and a contactless circuit, for example by storing authentication keys in the security circuit (e.g. the secure element) and by using them for the bonding or other authentication. Data can be transmitted application-specifically in encrypted or unencrypted form via the data channel between the security circuit and the control circuit.

User data can be exported in encrypted or unencrypted form to the control circuit.

The secure element is typically not fully utilized or taken up with the security-related applications for which it is normally used, so that free capacities can be used in different example embodiments to provide NFC applications.

Example embodiments of the disclosure are shown in the figures and are explained in detail below.

BRIEF DESCRIPTION OF THE FIGURES

In the figures:

FIG. 5 shows a flow diagram of a method for performing a near-field communication according to different example embodiments.

DETAILED DESCRIPTION

In the following detailed description, reference is made to the attached drawings which form part of said description and in which, by way of illustration, specific embodiments are shown in which the disclosure can be carried out. In this respect, the directional terminology, such as "above", "below", "behind", "front", "rear", etc. is used with reference to the orientation of the described figure(s). Since components of embodiments can be positioned in a number of different orientations, the directional terminology is used for illustrative purposes and is in no way limiting. Other embodiments can obviously be used and structural or logical modifications can be made without departing the protective scope of the present invention. The features of the different example embodiments described herein can obviously be combined with one another unless specifically indicated otherwise. The following detailed description is therefore not to be interpreted in a limiting sense, and the protective scope of the present invention is defined by the attached claims.

In this description, the terms "linked", "connected" and "coupled" are used to describe both a direct and an indirect link, a direct or indirect connection and a direct or indirect coupling. Identical or similar elements are denoted with identical reference numbers in the figures, insofar as this is appropriate.

Figure 1A:
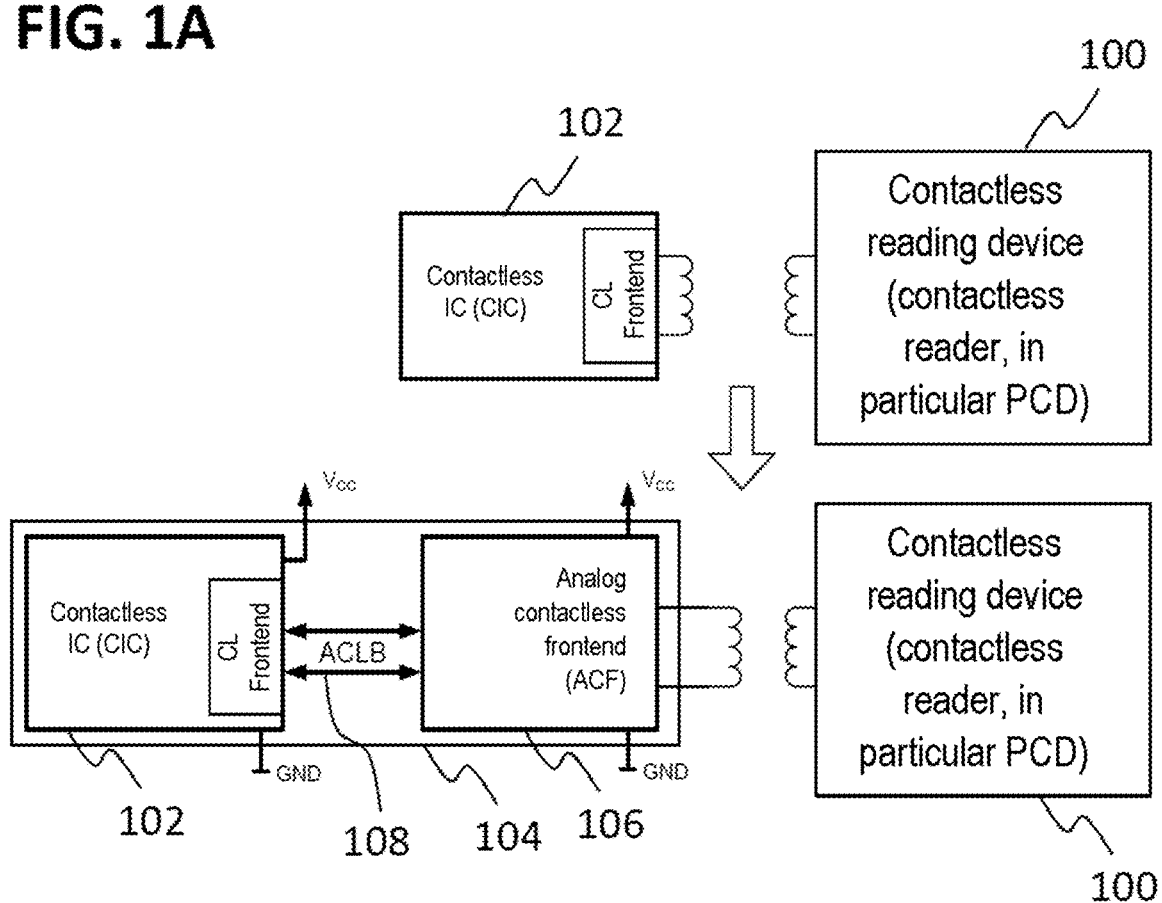
FIG. 1A shows a schematic representation of a system for performing a near-field communication according to the prior art.
Figure 1B:
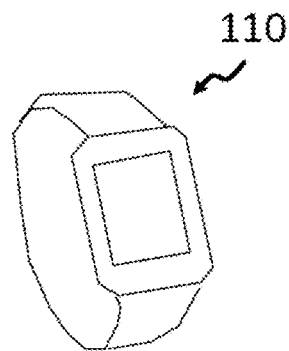
FIG. 1B shows an NFC system with a small form factor according to the prior art.
Figure 2:
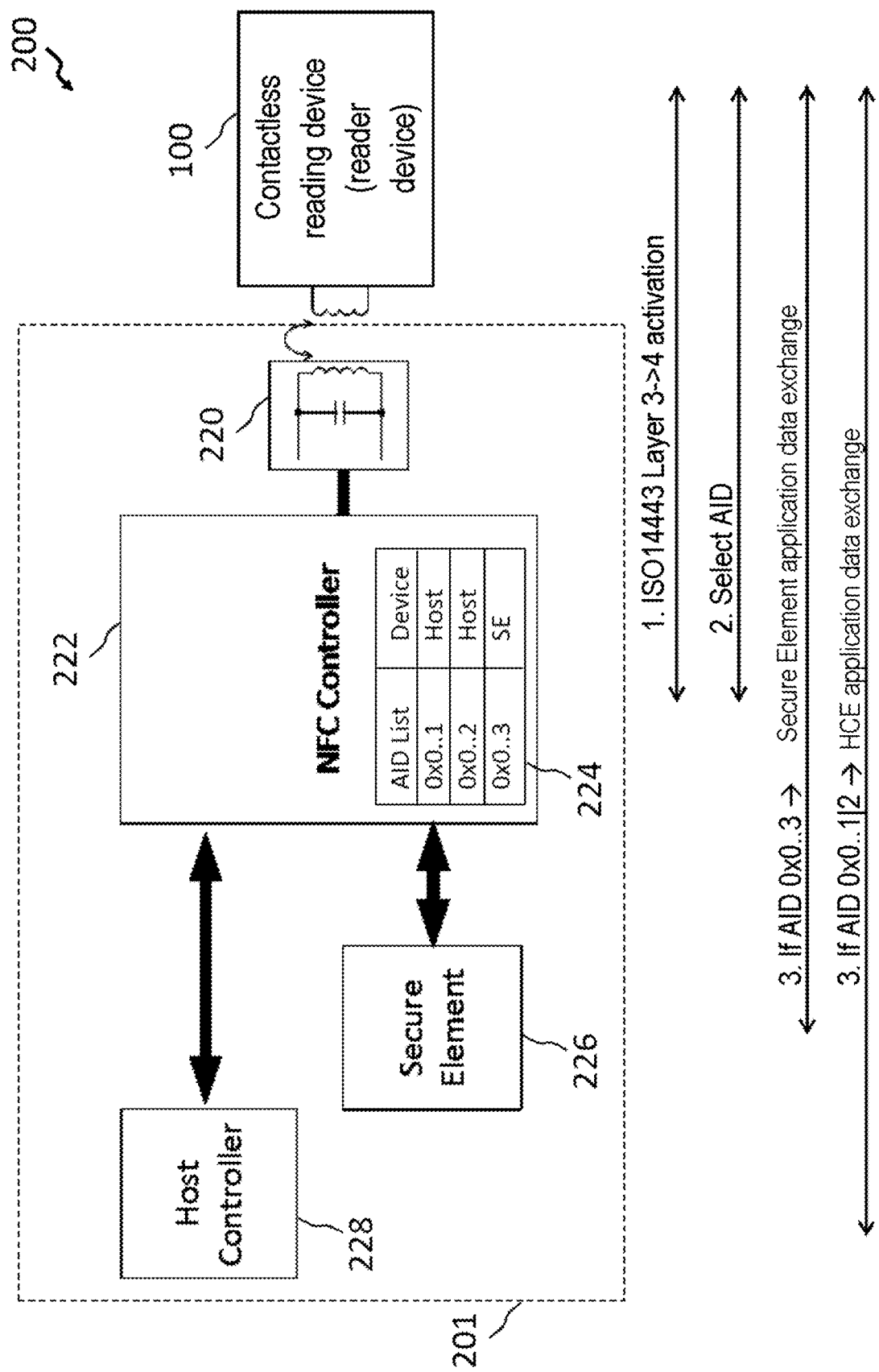
FIG. 2 shows a schematic representation of a system for performing a near-field communication according to the prior art.

FIG. 2 shows a schematic representation of a system 200 for performing a near-field communication according to the prior art. The system has, on the one hand, a circuit 201 for performing the near-field communication and, on the other hand, an external contactless reading device 100. The circuit 201 has a boosted NFC circuit 222 with an antenna 220 in an external AC coupling.

The circuit 201 can be regarded as a conventional architecture for an NFC controller, as used, for example, in a card/tag emulation for smart wearables.

A provision of an HCE, i.e. of applications which are not data-security-related and which are typically executed by a host controller 228, currently requires a conventional NFC architecture, including an NFC controller 222, as defined as standard in the NFC Forum.

Application identifiers, also referred to as application IDs or AIDs, are stored in this case in the NFC controller 222 for the host and a secure element (SE) 226. Data to be exchanged are then forwarded according to the AID to the secure element 226 or to the host controller 228.

This means that, as shown under 1. in FIG. 2, the data signals can first be transmitted to the NFC controller 222 following a Layer 3→4 activation according to ISO 14443. As shown under point 2, an AID can be selected (or allocated) in the NFC controller 222 according to the application for which the data signals are provided. Then (e.g. if the AID is 0x0 . . . 3, cf. the allocation table 224), a data channel is then opened to the security circuit 226, as shown under point 3. (above), and the data signals are exchanged by means of the data channel. Alternatively, as shown under point 3. (below), e.g. if the AID is 0x0 . . . 1 or 0x0 . . . 2, cf. the allocation table 224, a data channel is opened to the control circuit 228 and the data signals are exchanged by means of the data channel.

Figure 3:
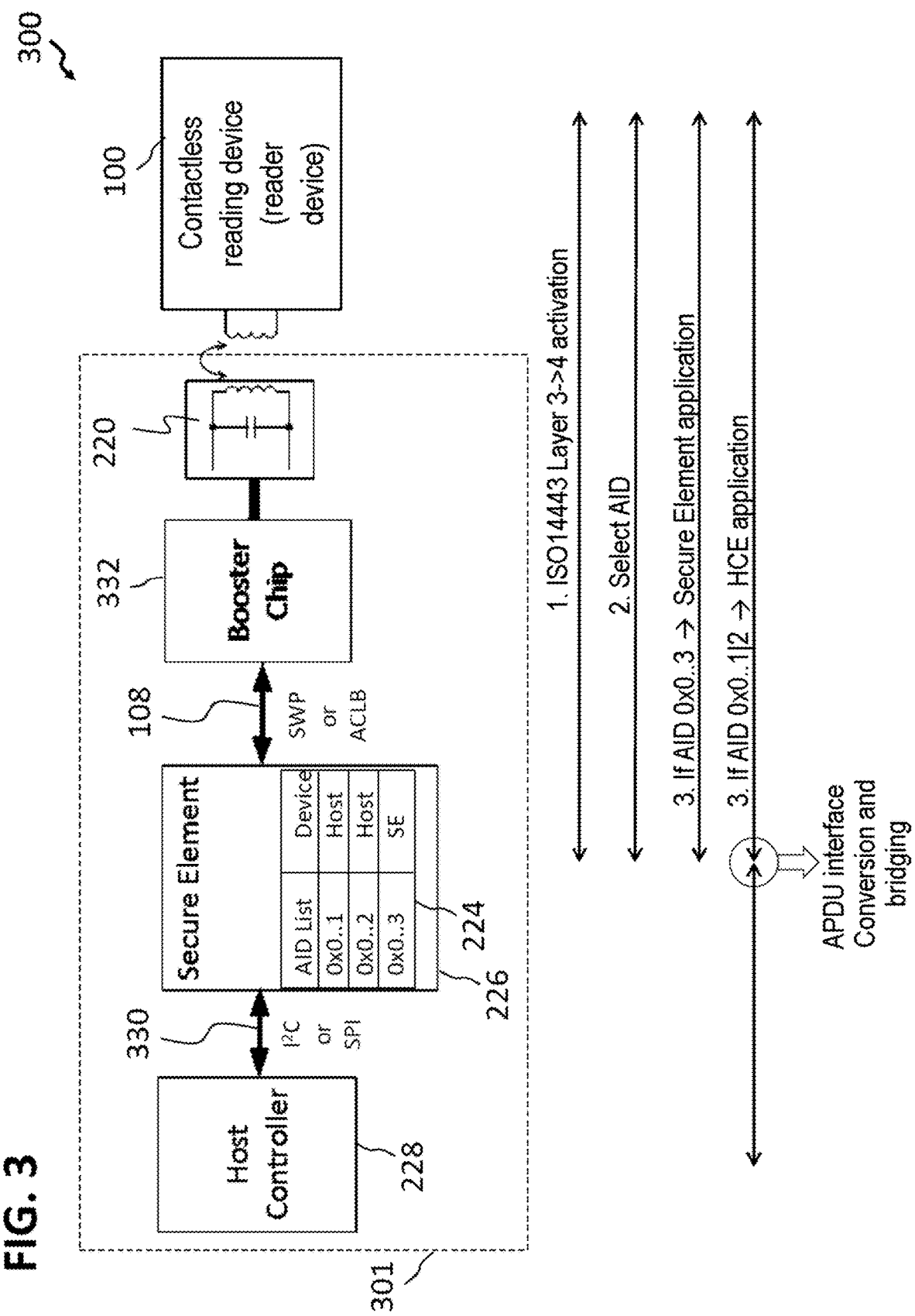
FIG. 3 shows a schematic representation of a system for performing a near-field communication according to different example embodiments.

FIG. 3 shows a schematic representation of a system 300 for performing a near-field communication according to different example embodiments. The system 300 can have a circuit for performing the near-field communication 301 according to different example embodiments and an external contactless reading device 100.

The circuit for performing a near-field communication 301 can have a contactless circuit 220 which is configured for the contactless exchange of data signals with the external contactless reading device 100, a security circuit 226 (e.g. a secure element) which is configured to execute security-related applications, and a control circuit 228 (e.g. the host controller) which is configured to execute non-security-related applications.

The data signals which are exchanged between the contactless reading device 100 and the contactless circuit 220 can comply with the ISO/IEC 14443 protocol. The security circuit 226 and the contactless circuit 220 can be configured accordingly to exchange the data signals according to ISO/IEC 14443.

The contactless circuit 220, the security circuit 226 and the control circuit 228 can be coupled with one another and configured in such a way that the data signals are supplied from the contactless circuit 220 to the control circuit 228 (and vice versa) exclusively by means of the security circuit 226.

The circuit 301 can furthermore have a booster circuit 332 which can be configured to boost data signals received by the security circuit 226 and supply the boosted data signals to the contactless circuit 220. The booster circuit 332 can be formed, for example, as an (e.g. conventional) booster chip which is supplied with an operating voltage and can be configured to provide an active amplitude modulation.

The control circuit 228 can be formed, for example, as a host controller. The control circuit 228 can be configured to perform a direct exchange of the data signals exclusively with the security circuit 226.

A data link can be provided for this purpose between the security circuit 226 and the control circuit 228, e.g. a serial data bus, e.g. an inter-integrated circuit or a serial peripheral interface.

The booster circuit 332 can furthermore be configured to perform a direct exchange of the data signals only with the security circuit 226 and the contactless circuit 220.

The coupling 108 between the booster circuit 332 and the security circuit 226 can have, for example, a single wire protocol interface or an advanced contactless bridge.

The circuit for performing a near-field communication 301 can clearly be designed so that the control circuit 228, the security circuit 226 and the booster circuit 332 are coupled in series, in contrast to the prior art in which the control circuit 228 and the security circuit 226 are connected in series to the booster circuit 322 but in parallel to one another.

In different example embodiments, the control circuit 228 can be configured to execute non-security-related applications (e.g. "Android Pay" or similar).

The data signals can accordingly have security-related data signals for provision to or provided by at least one of the security-related applications (which can be executed in or by the security circuit 226, e.g. an encryption and/or decryption of the data signals, a generation and/or a verification of a key or similar), and/or non-security-related data signals for provision to or provided by at least one of the non-security-related applications (which can be executed in or by the control circuit 228).

The data signals can have an identifier by means of which they can be allocated to an application by which or for which they have been/are provided. The identifier can have or can be, for example, the AID described above.

The security circuit 226 can have a memory. An allocation of an identifier to security-related data signals (or a device which can be configured to process the security-related data signals, e.g. the security circuit 226, e.g. the secure element) or non-security-related data signals (or a device which can be configured to process the non-security-related data signals (e.g. the control circuit 228, e.g. the host controller) can be stored in the memory of the security circuit.

The security circuit 226 can be configured to determine, on the basis of the identifier, whether the data signals are the security-related data signals or the non-security-related data signals.

In other words, the security circuit 226 can carry out a subdivision of the data signals into the security-related and the non-security-related data signals on the basis of the identifier (e.g. the AID).

In the case where it has been determined that the data signals are the non-security-related data signals, the security circuit 226 can be configured to supply said data signals to the control circuit.

FIG. 3 shows a flow of the data signals to illustrate how the boosted NFC architecture enables the performance of host card emulations.

As shown under 1. in FIG. 2, the data signals, The AIDs can be stored in the security circuit 226 (e.g. as an allocation table 224 or similar) and indicate whether an NFC application is to be found in the security circuit (e.g. SE) are in the control circuit (e.g. host controller). According to this routing information, the application is executed directly in the security circuit (SE) 226 by means of its application software (e.g. an applet), or a bridge is opened to the control circuit 228, corresponding to a second data flow channel.

The security circuit 226 can furthermore be configured to control the contactless circuit 220, for example through the transmission by the security circuit 226 of waiting time extension information by means of the booster circuit 332 to the contactless circuit 220 (and from there to the reading device 100).

Figure 4:
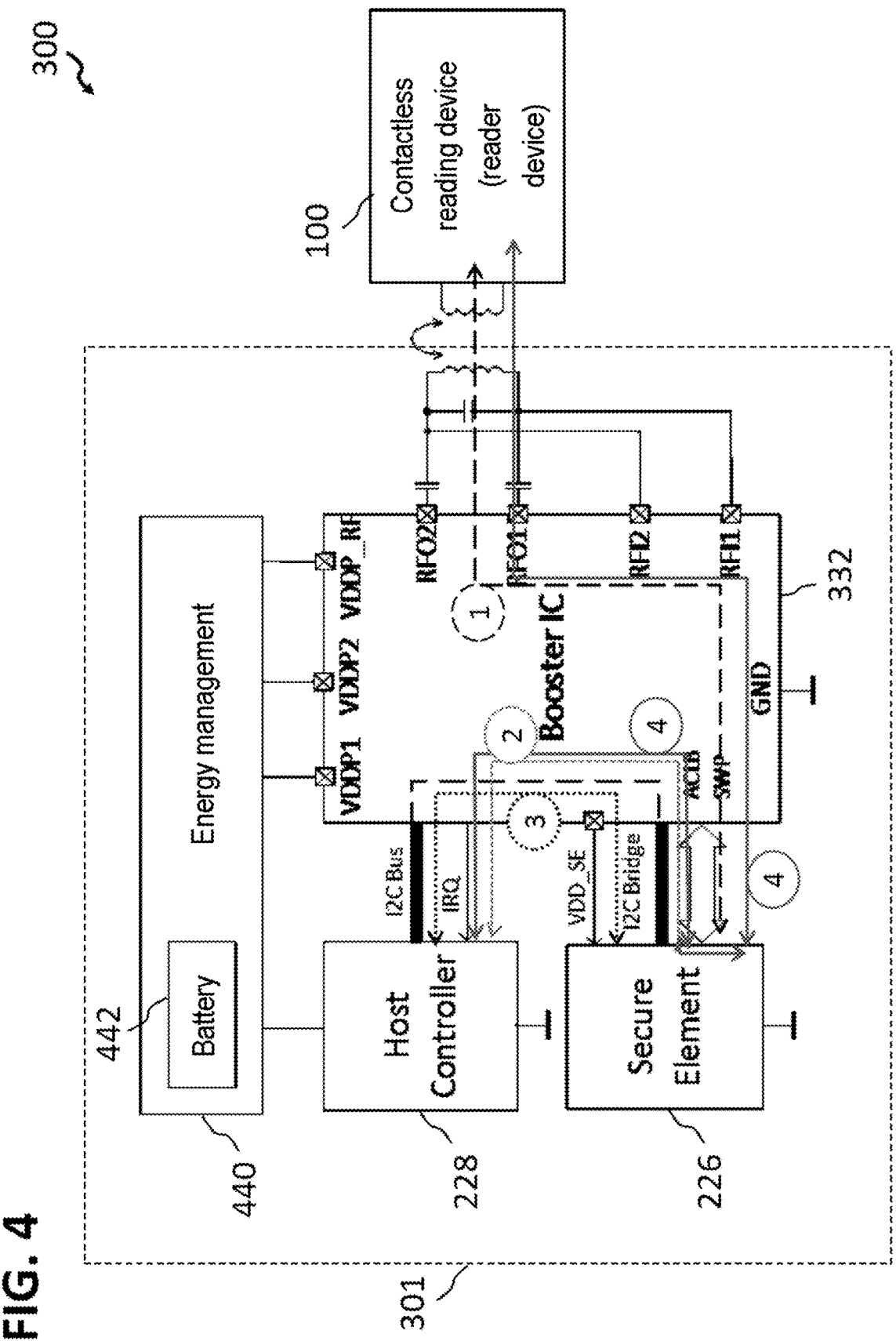
FIG. 4 shows a schematic representation of a system for performing a near-field communication according to different example embodiments.

The security circuit 226 can furthermore be configured to encode and/or decode the data stream from the contactless circuit 220 to the control circuit 228 and by means of an I$^2$C or SPI interface FIG. 4 shows a schematic representation of the system 300 for performing a near-field communication according to different example embodiments. It illustrates a technical implementation which enables secure applications and HCE-NFC applications. A 3-phase XOR modulation with attenuation is used.

As described in FIG. 3 under 1. and illustrated in the diagram shown in FIG. 4 at the position indicated by an encircled 1, the Layer 3→4 activation is performed by the security circuit 226 (e.g. the secure element).

As described in FIG. 3 under 2. and illustrated in the diagram shown in FIG. 4 at the position indicated by an encircled 2, if the AID is allocated to the control circuit 228 (the host), an IRQ trigger can be transmitted from the security circuit 226 (SE) to the control circuit 228 (the host controller) by means of an additional communication channel.

As illustrated in FIG. 4 at the position indicated by an encircled 3 in the diagram, the control circuit 228 (host controller) can transmit an I$^2$C master to I$^2$C slave bus address of the security circuit 226 (SE) and can check a buffer of the security circuit 226.

As illustrated in FIG. 4 at the position indicated by an encircled 4 in the diagram, a Layer 4 data exchange is performed from the control circuit 228 (host controller) to the reading device 100 by means of the security circuit 226 (by means of I$^2$C) and the booster circuit 332 (booster, by means of SWP or ACLB).

FIG. 5 shows a flow diagram 500 of a method for performing a near-field communication according to different example embodiments.

The method entails receiving data signals which are supplied by an external contactless reading device, by means of a contactless circuit (in 510), determining, in a security circuit, whether the data signals relate to a security-related application or non-security-related application (in 520) and, in a case where it is determined that the data signals relate to a non-security-related application, supplying the data signals from the security circuit to a control circuit and executing the non-security-related application in the control circuit using the data signals (530A), and, in a case where it is determined that the data signals relate to a security-related application, executing the security-related application using the data signals in the security circuit (530B).

In summary, a number of example embodiments are indicated below.

Example embodiment 1 is a circuit for performing a near-field communication. The circuit can have a contactless circuit which is configured for the contactless exchange of data signals with an external contactless reading device, a security circuit which has a memory in which application identifiers are stored and which is configured to execute security-related applications, and a control circuit which is configured to execute non-security-related applications, wherein the contactless circuit, the security circuit and the control circuit are coupled with one another in such a way and, using at least one of the application identifiers, are configured in such a way that the data signals are supplied from the contactless circuit to the control circuit and vice versa exclusively by means of the security circuit.

Example embodiment 2 is a circuit according to example embodiment 1, wherein the circuit furthermore has a booster circuit which is configured to boost data signals received by the security circuit and supply the boosted data signals to the contactless circuit.

Example embodiment 3 is a circuit according to example embodiment 1 or 2, wherein the control circuit is configured to perform a direct exchange of the data signals exclusively with the security circuit.

Example embodiment 4 is a circuit according to one of example embodiments 1 to 3, wherein the booster circuit is configured to perform a direct exchange of the data signals only with the security circuit and the contactless circuit.

Example embodiment 5 is a security circuit according to one of example embodiments 1 to 4, wherein the data signals have security-related data signals for provision to or provided by at least one of the security-related applications, and/or non-security-related data signals for provision to or provided by at least one of the non-security-related applications.

Example embodiment 6 is a circuit according to example embodiment 5, wherein the data signals have one of the application identifiers, and wherein the security circuit is furthermore configured to determine, on the basis of the application identifier, whether the data signals are the security-related data signals or the non-security-related data signals and, in the case where it has been determined that the data signals are the non-security-related data signals, to supply said data signals to the control circuit.

Example embodiment 7 is a circuit according to example embodiment 6, wherein an allocation of an application identifier to security-related data signals or non-security-related data signals is stored in the memory of the security circuit.

Example embodiment 8 is a circuit according to one of example embodiments 1 to 7, wherein the contactless circuit and the security circuit are configured to exchange the data signals according to ISO/IEC 14443 or a different contactless protocol such as ISO/IEC 18092.

Example embodiment 9 is a circuit according to one of example embodiments 2 to 8, wherein the coupling between the booster circuit and the security circuit has a single wire protocol interface or an advanced contactless bridge or a different digital or analog interface for the data exchange.

Example embodiment 10 is a circuit according to one of example embodiments 1 to 9, wherein the coupling between the security circuit and the control circuit has a serial data bus.

Example embodiment 11 is a circuit according to example embodiment 10, wherein the serial data bus has an inter-integrated circuit or a serial peripheral interface.

Example embodiment 12 is a circuit according to one of example embodiments 1 to 11, furthermore having at least one authentication key stored in the memory of the security circuit, wherein the security circuit and the control circuit are configured to supply the data signals from the contactless circuit to the control circuit and vice versa and to set up a secure data channel between the control circuit and the contactless reading device, using at least one of the authentication keys stored in the security circuit, for the contactless exchange of the data signals with the external contactless reading device.

Example embodiment 13 is a circuit according to example embodiment 12, wherein the at least one authentication key and the at least one application identifier are allocated to one another.

Example embodiment 14 is a circuit according to example embodiment 13, wherein the allocation is a pair-by-pair allocation.

Example embodiment 15 is a circuit according to one of example embodiments 1 to 14, wherein at least one key for a data encryption is furthermore stored in the security circuit and the security circuit can be configured to encrypt data supplied by the control circuit by means of the key and store said data in the control circuit.

Example embodiment 16 is a method for performing a near-field communication. The method entails receiving data signals which are supplied by an external contactless reading device, by means of a contactless circuit, determining, in a security circuit and using application identifiers stored in the security circuit, whether the data signals relate to a security-related application or a non-security-related application and, in a case where it is determined that the data signals relate to a non-security-related application, supplying the data signals from the security circuit to a control circuit and executing the non-security-related application in the control circuit using the data signals, and, in a case where it is determined that the data signals relate to a security-related application, executing the security-related application using the data signals in the security circuit.

Example embodiment 17 is a method according to example embodiment 16, wherein the method furthermore entails boosting, by means of a booster circuit, the data signals received in the contactless circuit and supplying the boosted data signals to the security circuit.

Example embodiment 18 is a method according to example embodiment 16 or 17, wherein the data signals have an identifier, and wherein the determination of whether the data signals relate to a security-related application or a non-security-related application is performed on the basis of the identifier.

Example embodiment 19 is a method according to example embodiment 18, wherein an allocation of an identifier to security-related data signals or non-security-related data signals is stored in the security circuit.

Example embodiment 20 is a method according to one of example embodiments 16 to 19, wherein data signals are received according to ISO/IEC 14443 or ISO/IEC 18092.

Example embodiment 21 is a method according to one of example embodiments 16 to 20, wherein further data signals are supplied from the contactless circuit to the external contactless reading device.

Example embodiment 22 is a method according to one of example embodiments 16 to 21, which furthermore entails generating a secure data channel between the control circuit and the external contactless reading device using at least one authentication key stored in the security circuit.

Example embodiment 23 is a method according to one of example embodiments 16 to 22 which furthermore entails encrypting data supplied by the control circuit by means of a key stored in the security circuit for a data encryption and storing the encrypted data in the control circuit.

Example embodiment 24 is a device for performing a near-field communication which has a circuit according to one of example embodiments 1 to 15.

Example embodiment 25 is a device according to example embodiment 24, wherein the device is designed as a wearable.

Some of the example embodiments are described in connection with devices, and some of the example embodiments are described in connection with methods. Further advantageous designs of the method can be found in the description of the device and vice versa.

The invention claimed is:

1. A circuit for performing a near-field communication, comprising:
   a contactless circuit which is configured for the contactless exchange of data signals with an external contactless reading device;
   a security circuit which has a memory in which application identifiers are stored, and which is configured to determine whether the data signals relate to a security-related application or a non-security-related application and to execute security-related applications; and
   a control circuit which is configured to execute non-security-related applications,
   wherein the contactless circuit, the security circuit, and the control circuit are coupled with one another in such a way and, using at least one of the application identifiers, are configured in such a way that the data signals are supplied from the contactless circuit to the control circuit and vice versa exclusively by means of the security circuit.

2. The circuit as claimed in claim 1, further comprising:
   a booster circuit which is configured to boost data signals received by the security circuit and supply the boosted data signals to the contactless circuit.

3. The circuit as claimed in claim 1, wherein the data signals comprise:
   security-related data signals for provision to or provided by at least one of the security-related applications; or
   non-security-related data signals for provision to or provided by at least one of the non-security-related applications.

4. The circuit as claimed in claim 3,
   wherein the data signals have one of the application identifiers, and wherein the security circuit is further configured to determine, on the basis of the application identifier, whether the data signals are the security-related data signals or the non-security-related data signals and, in the case where it has been determined that the data signals are the non-security-related data signals, to supply said data signals to the control circuit.

5. The circuit as claimed in claim 4,
wherein an allocation of an application identifier to security-related data signals or non-security-related data signals is stored in the memory of the security circuit.

6. The circuit as claimed in claim 1,
wherein the coupling between the booster circuit and the security circuit has a serial data bus.

7. The circuit as claimed in claim 1, further comprising:
at least one authentication key stored in the memory of the security circuit,
wherein the security circuit and the control circuit are configured to supply the data signals from the contactless circuit to the control circuit and vice versa and to set up a secure data channel between the control circuit and the contactless reading device, using at least one of the authentication keys stored in the security circuit, for the contactless exchange of the data signals with the external contactless reading device.

8. The circuit as claimed in claim 7,
wherein the at least one authentication key and the at least one application identifier are allocated to one another.

9. The circuit as claimed in claim 1,
wherein at least one key for a data encryption is further stored in the security circuit, and the security circuit is configurable to encrypt data supplied by the control circuit by means of the key and store said data in the control circuit.

10. A method for performing a near-field communication, comprising:
receiving data signals, which are supplied by an external contactless reading device, by means of a contactless circuit;
determining, in a security circuit and using application identifiers stored in the security circuit, whether the data signals relate to a security-related application or a non-security-related application;
in a case where it is determined that the data signals relate to a non-security-related application, supplying the data signals from the security circuit to a control circuit and executing the non-security-related application in the control circuit using the data signals; and
in a case where it is determined that the data signals relate to a security-related application, executing the security-related application using the data signals in the security circuit.

11. The method as claimed in claim 10, further comprising:
boosting, by means of a booster circuit, the data signals received in the contactless circuit; and
supplying the boosted data signals to the security circuit.

12. The method as claimed in claim 10,
wherein the data signals have an identifier, and wherein the determination of whether the data signals relate to a security-related application or a non-security-related application is performed on the basis of the identifier.

13. The method as claimed in claim 12,
wherein an allocation of an identifier to security-related data signals or non-security-related data signals is stored in the security circuit.

14. The method as claimed in claim 10, further comprising:
generating a secure data channel between the control circuit and the external contactless reading device using at least one authentication key stored in the security circuit.

15. The method as claimed in claim 10, further comprising:
encrypting data supplied by the control circuit by means of a key stored in the security circuit for a data encryption; and
storing the encrypted data in the control circuit.

16. A device for performing a near-field communication, comprising:
a circuit as claimed in claim 1.

17. The device as claimed in claim 16,
wherein the device is designed as a wearable.

18. The method as claimed in claim 10, wherein the contactless circuit, the security circuit, and the control circuit are coupled with one another in such a way that the data signals are supplied from the contactless circuit to the control circuit and vice versa exclusively by means of the security circuit.

* * * * *